US011256648B1

(12) United States Patent
Pan et al.

(10) Patent No.: US 11,256,648 B1
(45) Date of Patent: Feb. 22, 2022

(54) VIRTUAL HOT PLUG SYSTEM AND METHOD FOR PCIE DEVICES

(71) Applicant: XILINX, INC., San Jose, CA (US)

(72) Inventors: Chuan Cheng Pan, San Jose, CA (US); Hanh Hoang, Pleasanton, CA (US); Chandrasekhar S. Thyamagondlu, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/037,396

(22) Filed: Sep. 29, 2020

(51) Int. Cl.
*G06F 13/40* (2006.01)
*G06F 13/24* (2006.01)
*G06F 13/42* (2006.01)

(52) U.S. Cl.
CPC .......... *G06F 13/4081* (2013.01); *G06F 13/24* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 7,356,636 B2 | 4/2008 | Torudbakken et al. | |
| 7,743,197 B2 | 6/2010 | Chavan et al. | |
| 7,752,360 B2 | 7/2010 | Galles | |
| 7,904,629 B2 | 3/2011 | Daniel | |
| 8,762,698 B2 | 6/2014 | Khosravi et al. | |
| 9,430,432 B2 * | 8/2016 | Kanigicherla | G06F 13/40 |
| 9,842,075 B1 * | 12/2017 | Davis | G06F 13/4295 |
| 10,509,758 B1 | 12/2019 | Habusha et al. | |
| 2007/0067435 A1 * | 3/2007 | Landis | G06F 11/1484 709/224 |
| 2011/0179414 A1 * | 7/2011 | Goggin | G06F 9/45533 718/1 |
| 2012/0054744 A1 * | 3/2012 | Singh | G06F 9/45558 718/1 |
| 2012/0131201 A1 | 5/2012 | Matthews et al. | |
| 2012/0159245 A1 * | 6/2012 | Brownlow | G06F 11/0784 714/23 |
| 2012/0166690 A1 * | 6/2012 | Regula | G06F 13/404 710/104 |
| 2012/0167085 A1 * | 6/2012 | Subramaniyan | G06F 13/105 718/1 |
| 2013/0115819 A1 * | 5/2013 | Liu | H01R 12/721 439/628 |
| 2017/0177854 A1 * | 6/2017 | Gligor | G06F 21/57 |

(Continued)

OTHER PUBLICATIONS

PCI Express Base Specification Revision 5.0 Version 0.9, PCI-SIG 18, Oct. 2018, CH 6.7, pp. 800-815.

(Continued)

*Primary Examiner* — Henry Tsai
*Assistant Examiner* — Christopher A Bartels
(74) *Attorney, Agent, or Firm* — Patterson + Sheridan, LLP

(57) ABSTRACT

A method for managing a pool of physical functions in a PCIe integrated endpoint includes receiving a configuration instruction indicating a topology for a PCIe connected integrated endpoint (IE), and implementing the topology on the IE. The method further includes receiving a hot plug instruction, and, based at least in part, on the hot plug instruction, adding or removing a virtual endpoint (vEP) to or from a virtual downstream port (vDSP) on the IE.

20 Claims, 4 Drawing Sheets

(56) References Cited

U.S. PATENT DOCUMENTS

| | | | |
|---|---|---|---|
| 2017/0235562 A1* | 8/2017 | Bafna | G06F 16/2365 |
| | | | 718/1 |
| 2018/0136851 A1* | 5/2018 | Batra | G06F 3/0688 |
| 2018/0276161 A1 | 9/2018 | Ahn | |
| 2019/0227714 A1* | 7/2019 | Duncan | G06F 3/061 |
| 2021/0271500 A1* | 9/2021 | Elliott | G06F 13/4282 |

OTHER PUBLICATIONS

Application Note: Virtex-7 Family—Designing with SR-IOV Capability of Xilinx Virtex-7 PCI Express Gen3 Integrated Block, dated Nov. 15, 2013, consists of 26 pages.

Xilinx All Programable—DMA/Bridge Subsystem for PCI Express v4.0 Product Guide, Video Design Suite, dated Dec. 20, 2017, consists of 140 pages.

U.S. Appl. No. 16/690,212, filed Nov. 21, 2019 Entitled "Virtualized Peripheral Component Interconnet express (PCIE) Device" (Xilinx Ref. X-5867 US).

Xilinx All Programable—UltraScale Devices Gen3 Integrated Block for PCI Express v4.3, LogicCORE IP Product Guide, Video Design Suite, dated Jun. 7, 2017, pp. 1-156.

* cited by examiner

US 11,256,648 B1

VIRTUAL HOT PLUG SYSTEM AND METHOD FOR PCIE DEVICES

TECHNICAL FIELD

Embodiments of the present invention generally relate to adding and removing PCIe devices, and in particular to a virtual plug system and method for hot adding or removing PCIe devices.

BACKGROUND

The Peripheral Component Interconnect Express (PCIe) architecture is designed to natively support both hot-add and hot-removal ("hot-plug") of cables, add-in cards, and modules. PCIe hot-plug support provides a "toolbox" of mechanisms that allow different user/operator models to be supported using a self-consistent infrastructure.

In modern datacenter applications, adaptability is important, especially on the input/output (IO) side. For example, when using SmartNIC or SmartSSD, which are connected to data centers via a link, the conventional method of connecting over a PCIe link is through a PCIe switch using the hot plug mechanism. In this method the hot plug mechanism is embedded in a downstream port of the PCIe switch, to either hot add or hot remove a device which has one or more physical functions. It is noted that the SmartNIC example, named above, is a network interface card that offloads processing tasks that a system CPU would normally handle. Using its own on-board processor, the smartNIC may be able to perform any combination of encryption/decryption, firewall, transmission control protocol/internet protocol (TCP/IP) and hypertext transfer protocol (HTTP) processing.

Conventionally a PCIe topology is followed, and an actual PCIe switch is physically placed between data center hosts and PCIe devices, which adds costs to both silicon as well as board designs. Moreover, the conventional approach also requires an on-site action, such as, for example, an attention button, in order to physically add or remove the device to or from being connected to the host. In modern connectivity contexts, this is simply not feasible, as a given data center (where the host is) may be far away from a manager site, where an enterprise's operations center is. Thus, a mechanism for remote configuration of PCIe linked devices is needed.

Additionally, due to the increasing capability of FPGAs, which can host more Physical Functions for more accelerators, dynamic allocation is also desired to add or remove a single Physical Function, or a group of Physical Functions, without pre-assigning a fixed relationship with a hot plug mechanism such as a PCIe device connecting to a PCIe switch downstream port.

What is needed are systems and related methods to overcome the limitations of conventional PCIe hot plug mechanisms.

SUMMARY

A method for virtually hot adding or hot removing PCIe physical functions ("PFs") is described herein. A PCIe integrated endpoint system is also described herein. In one example, a method for managing a pool of physical functions in a PCIe integrated endpoint includes receiving a configuration instruction indicating a topology on a PCIe connected integrated endpoint (IE), implementing the topology on the IE, and receiving a hot plug instruction. The method further includes, based, at least in part, on the hot plug instruction, adding or removing at least one virtual endpoint (vEP) to or from a virtual downstream port (vDSP) on the IE.

In another example, a PCIe integrated endpoint system includes a PCIe connected IE having a pool of physical functions, and a virtual hot plug controller ("VHPC"). The VHPC is configured to: receive a configuration instruction indicating a topology on the IE, and implement the topology on the IE. The VHPC is further configured to receive a hot plug instruction, in response to the hot plug instruction, add or remove a virtual endpoint (vEP) to or from a virtual downstream port (vDSP) on the IE, and initiate at least one PCIe interrupt to inform a host as to the topology.

BRIEF DESCRIPTION OF THE DRAWINGS

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

To facilitate understanding, identical reference numerals have been used, where possible, to designate identical elements that are common to the figures. It is contemplated that elements of one embodiment may be beneficially incorporated in other embodiments.

DETAILED DESCRIPTION

In one or more examples, PCIe hot plug limitations are solved by using a virtual hot plug controller to manage a pool of Physical Functions in a PCIe integrated endpoint. In one or more examples, the virtual hot plug controller provides remote configuration, dynamic allocation, and PCIe compliance without the need for an actual switch. As a result, there is no needed change on a host side and thus no additional costs.

In one or more examples, the virtual PCIe hot plug controller may virtually hot add or hot remove either a single PCIe Physical Function, or group of PCIe Physical Functions, as devices via a native PCIe hot plug mechanism without a physical switch. In one or more examples, FPGA soft logics and/or software intervention may be used to provide remote configuration, dynamic allocation, and PCIe compliance.

Thus, in one or more examples, where, due to expanded hardware capabilities, multiple virtual devices are provided on a single physical card, and thus do not each have their own PCIe switch, a virtual hot plug controller emulates the hot plug functionality for any of those virtual devices on the physical card. In some examples a device may be a virtual card created by soft logics on a single FPGA card outside the IE. In one or more examples, each virtual device acts as if it has its own data mover, processing engines, etc. Each virtual device is associated with a physical function provided by the IE so that it can be bonded to and managed by a device driver on the host.

One or more examples may be implemented on any FPGA card that has enough soft logics for a user to build multiple devices that may be desired. Thus, in one or more examples, the capability is offered to change topology using the same card. Moreover, these changes may be effected remotely. For obvious reasons, this approach is faster, inasmuch as there is no need for a person specifying the changes to physically go to a data center and add or remove a PCIe switch or card.

Figure 1:
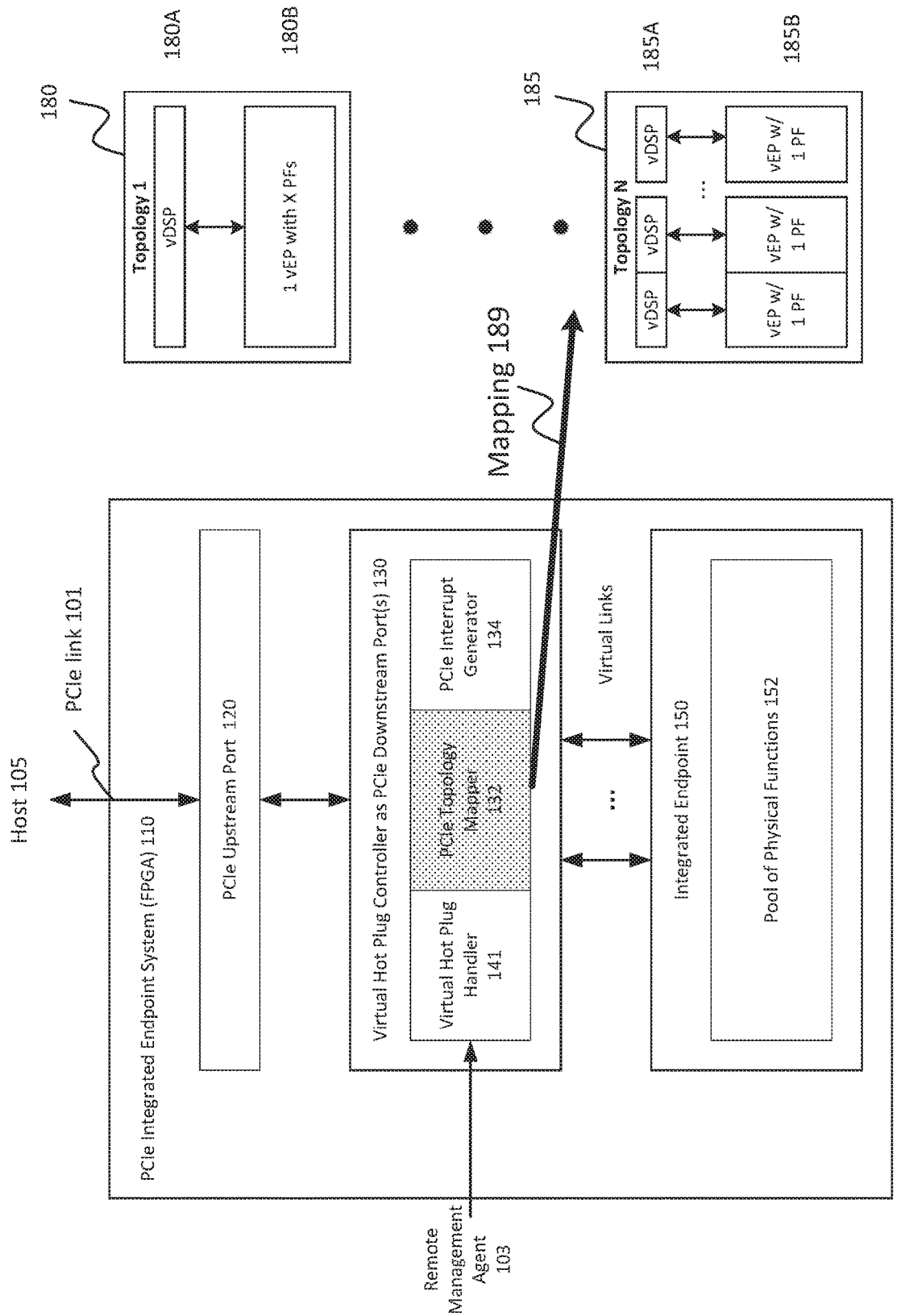
FIG. 1 illustrates an example system provided in a field programmable gate array ("FPGA"), according to an example.

FIG. 1 illustrates an example PCIe integrated endpoint system ("IES") 110 provided in a FPGA, according to an example. In one or more examples, a PCIe integrated endpoint system manages a pool of physical functions 152, in a dynamic way, and facilitates hot removal or hot addition of any of the physical functions ("PFs"), across a set of virtual devices amongst which the pool of PFs is then allocated. With reference to FIG. 1, the example PCIe IES 110 has three main blocks. These include a PCIe upstream port 120, a virtual hot plug controller ("VHPC") 130 implemented as one or more PCIe downstream port(s), and an integrated endpoint ("IE") 150.

In one or more examples, the PCIe Upstream Port 120 is used to connect with a Host 105 via a PCIe link, such as, for example, PCIe link 101. Host 105 may be, for example, any CPU in a data center. In general, the PCIe IES 110 may be understood as a single physical box or card that physically implements a pool of physical functions ("PFs"). However, it may allocate, as needed, all of those PFs across multiple virtual PCIe devices. In one or more examples, the VHPC 130 includes logic to provide information to host 105 so that the host 105 treats any of the virtual devices on the PCIe IES 110 as if that virtual device was a full-fledged independent PCIe device, with full hot plug functionality. This is the case, even though there is no physical switch, as in the conventional case.

In one or more examples, the information provided by the logic in the VHPC 130 to the host 105 is of the type that is conventionally sent to a host when a device is either hot added or hot removed from a PCIe link by inserting a card into a slot, or, for example, by removing a card from a physical slot. Because, as described below, in one or more examples, when a PF is virtually added to, or virtually removed from, a virtual downstream port, such that no actual physical card is either inserted or removed from a physical slot, in order to emulate the events of a physical hot add or hot remove, the VHPC supplies the requisite information that the host needs to see. In one or more examples, this information includes the PCI/PCIe capabilities defined by the specification. The key capabilities relevant to the present description are the number of PFs, and the number of address spaces, that the hot-add device needs. This flow is known as the "device discovery" or "bus enumeration."

In one or more examples, the virtual hot plug controller 130 may itself have three sub-blocks, as shown. These include, for example, a virtual hot plug handler 139, a PCIe topology mapper 132, and a PCIe interrupt generator 134. The virtual hot plug handler 139 receives hot plug configurations remotely, from, for example, a remote management agent 103. Remote management agent 103 is remote from the data center where both host 105 and the IES 110 are physically located. Remote management agent 103 may be coupled to PCIe integrated endpoint system 110 over an Ethernet connection, for example.

Continuing with reference to FIG. 1, in one or more examples, the hot plug configuration instructions sent by the remote management agent 103 may be, for example, "add Physical Function #3-6", or, for example, "remove Physical Function #21-23", or the like. In one or more examples, the remote management agent 103 may "see" the vDSPs and the vEPs, or it may not, in which latter case it simply sees one integrated IES card, and lets the PCIe topology mapper 132 create vEPs and apportion the PFs amongst them. Which approach is taken depends upon how much topology handling a given implementation wants to be processed on the card. In general, it is often preferred to have the topology mapper create and apportion the various virtual entities, given that the topology mapper is both closer and faster, and to let the remote management agent just provide higher-level instructions. However, for completeness, in one or more examples, both approaches are possible.

Upon receipt of a configuration instruction, VHPC 130 configures a PCIe topology mapper 132, and triggers PCIe interrupts, via PCIe interrupt generator 134, to inform the host 105 about the hot plug actions. It is here noted that a topology (e.g., how many vDSPs to provide on the IE) is expected to be defined during resets and remain fixed until the next reset. The topology mapper 132, based on the pre-defined topology, adds/removes one or multiple vEP(s) and their respective PFs to one or multiple vDSPs based on the hot plug instruction received from the remote management agent 103.

In one or more examples, the PCIe topology mapper 132 informs host 105 as to a current topology by responding to configuration requests from the PCIe host 105[. It is noted that the PCIe host 105 needs to know the topology so that it can arrange resources, such as, for example, address spaces. It is also noted that in the examples described herein, all configuration requests are sent by the host, and are all PCIe defined configuration requests.

In one or more examples, the IES 110 is seen by the host 105 as a switch (USP), first by responding to a configuration read request from the host to the Device/Port Type field of a "PCI Express Capabilities Register". As a result, host 105 will continue to enumerate downstream ports and devices by sending more configuration read requests.

Continuing further with reference to FIG. 1, PCIe topology mapper 132, in response to the received configuration instruction, thus apportions the various PFs in the pool of physical functions 152 amongst various virtual endpoints ("vEPs") in a topology, where each vEP is associated with a corresponding vDSP of the topology. There is thus a mapping 189 of PFs amongst each set of vEPs in a specific topology. Two such example topologies are shown in FIG. 1, and these example topologies assume that there are N total PFs in the pool of physical functions 152. A first topology, Topology 1 180 illustrates one extreme case of total "centrality", with a single vEP that owns all N Physical Functions. The single vEP 180B is connected to a single virtual downstream port ("vDSP") 180A. At the other extreme, Topology N 185 illustrates the case of one PF per vEP, and thus N vEPs 185B, each vEP connected to a corresponding respective vDSP 185A of the N vDSPs. As shown, topology N 185 implements a maximum "distribution of functions"

approach. In one or more examples, a topology can be anything between these two extremes.

After PCIe topology mapper 132 performs its mapping, and creates a topology in response to the received configuration instructions, VHPC 130 may receive a hot plug instruction, for example from the remote management agent 103, the hot plug instruction indicating to add or remove at least one vEP to or from a vDSP, and, in response, may add or remove at least one vEP to or from a vDSP. It is here recalled that the initial configuration instruction determines which topology is to be implemented. For example, with reference to FIG. 1, whether it is a centralized topology 180, a distributed topology 185, or any combination of the two in between those two options. The configuration instruction thus determines how many vDSPs there are to be in the topology.

Continuing with reference to FIG. 1, upon receipt of the hot plug instruction, one or more vEPs are removed or added to a vDSP, but that does not change the overall number of vDSPs in the topology, even if one or more vDSPs are now, as a result of the hot plug instruction, left without any vEPs. This is because a connection to a vDSP may be dangled, and the vDSP left used for a time. The number of vDSPs remains constant until a new configuration instruction is received.

Following implementation of the hot plug instruction, virtual hot plug handler 139 causes certain events to be triggered. For example, it may cause PCIe topology mapper 132 to update the status within the topology as to which vEP is connected to which vDSP. It may also, for example, cause PCIe interrupt generator 134 to send PCIe interrupts, such as, for example, MSI or MSI-X, to the host, so as to bind a device driver and allocate resources for hot adding a vEP and its assigned PFs, or to unbind a device driver and release resources for hot removing a vEP and its assigned PFs, so that the resource can be dynamically allocated. It is also noted that in one or more examples any communication between the IE system and the host faithfully follows the PCIe specification. Thus, the IE system "mimics" the PCIe switch behavior so that any conventional hosts can naturally and easily interoperate with the IE system.

Finally, with reference to FIG. 1, the third sub-block is the integrated endpoint ("IE") 150, which has the pool of physical functions 152. This sub-block receives the configurations from the PCIe Topology Mapper 132 and groups the PFs from the pool gf physical functions 152 into each vEP accordingly.

In one or more examples, in order to achieve adaptability, the PCIe topology mapper 132 sub-block may be implemented via two methods. A first method implements it in programmable units such as, for example, FPGA soft logics, to load a different topology. These soft logics include, for example, the user programmable logics (CLBs, BRAMs, etc.) shown in FIG. 4, and described below, Thus, this first method utilizes a traditional FPGA method of loading a different bitstream. A second method is to implement the PCIe topology mapper 132 via a bypass interface for a Firmware Kernel to directly respond to host configuration requests to create various topologies. This second method is next illustrated with reference to FIG. 2.

Figure 2:
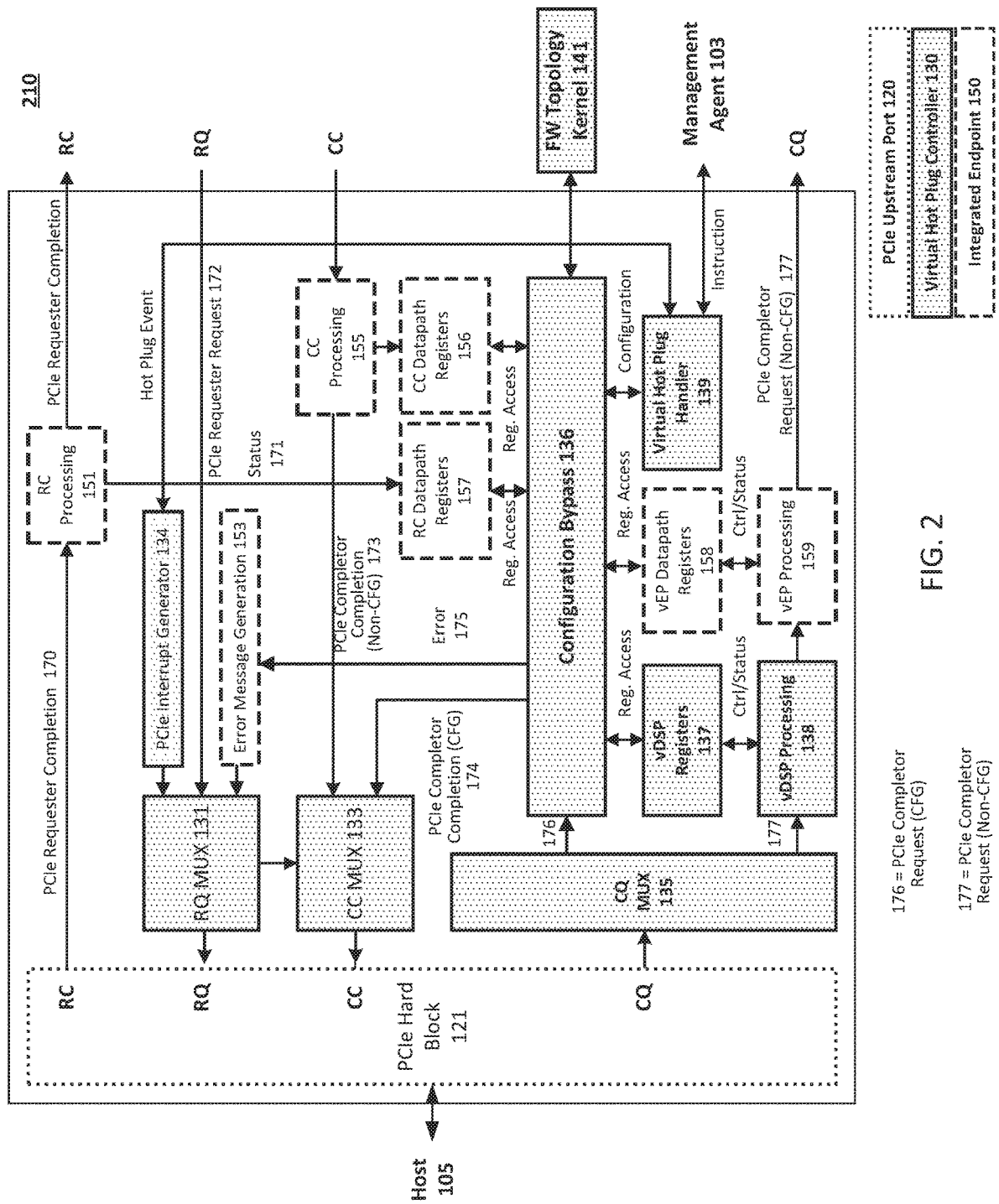
FIG. 2 illustrates an alternate example FPGA implementation, illustrating a "firmware intervention" method, according to an example.
Figure 4:
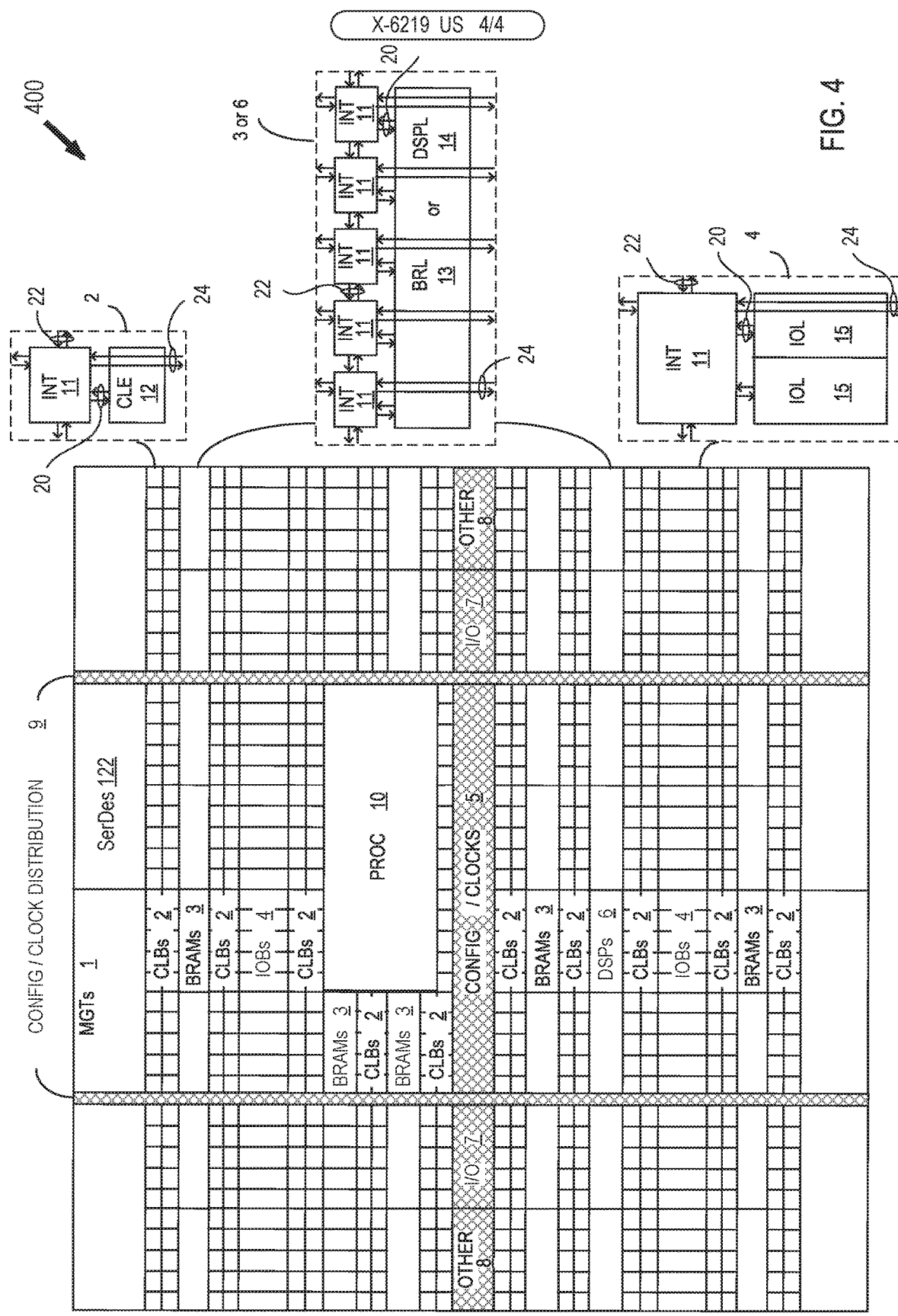
FIG. 4 illustrates an example architecture of an FPGA in which example systems described herein may be employed.

FIG. 2 illustrates an alternate example FPGA implementation of an example system, being PCIe integrated endpoint system 210, to illustrate the second, or "firmware intervention", method described above. FIG. 2 maps, via light shading and different lines around its depicted boxes, the three sub-blocks of the PCIe integrated endpoint system 110 illustrated in FIG. 1, and described above, to elements of an alternate example FPGA. Such an example FPGA is illustrated in FIG. 4 and described below.

With reference to FIG. 2, the key at the bottom right of the figure indicates which of the three sub-blocks of the example of FIG. 1, namely PCIe upstream port 120, VHPC 130 and IE 110, map to various elements of the example FPGA of FIG. 2. Thus, PCIe upstream port 120, shown at the left of FIG. 2 with a dotted line border, maps to PCIe hard block 121 of FIG. 2. It is this element that communicates with host 105. Similarly, VHPC 130, lightly shaded with a solid line border, maps to the eight elements of FIG. 2 also shown with light shading and a solid line border, and also to the firmware topology kernel 141 shown outside of, and at the right of, the example system 210. These nine VHPC elements in total have index numbers from 131 through 141. Finally, integrated endpoint 150, shown with a dashed line border, maps to the seven elements of FIG. 2 shown with dashed line borders. Given the shading used in FIG. 2, one may readily note the various elements that comprise each of the groups of elements implementing the VHPC 130, and the integrated endpoint 150, respectively.

Continuing with reference to FIG. 2, beginning with the elements of the system 210 that map to the PCIe upstream port 120 sub-block of FIG. 1, there is only one such element in FIG. 2, namely PCIe hard block 121. PCIe hard block 121 communicates with host 105 and also with several other elements of system 210, next described.

Next, VHPC 130, as shown, maps to nine separate elements. Each of these nine elements of FIG. 2 are shown as blocks having light shading, with a solid line border around each such block. Beginning at the top of the figure, these include PCIe interrupt generator 134, requester request (RQ) MUX 131, completer completion (CC) MUX 133, completor request (CQ) MUX 135, configuration bypass 136, vDSP registers 137, vDSP processing 138, and virtual hot plug handler 139.

Finally, the integrated endpoint 150 sub-block of FIG. 1 maps to seven separate elements of FIG. 2. Each of these elements are depicted in FIG. 2 as blocks without shading, but with a dashed line border. These seven elements include, beginning at the top of FIG. 2, requestor completion (RC) processing 151, error message generation 153, CC processing 155, RC datapath processing 157, CC datapath registers 156, vEP datapath registers 158, and vEP processing 159.

As may be appreciated by comparing FIG. 2 with previous FIG. 1, the PCIe Topology Mapper of FIG. 1 is, in the example of FIG. 2, now split into two pieces: the configuration bypass 136, and the FW topology kernel 141. Thus, in this example implementation, all of the configuration requests (PCIe completor request (CFG) 176 sent from host 105) are forwarded, via PCIe hard block 121, to CQ mux 135, and from there to configuration bypass 136 over link 176, which is for a PCIe completor request (configuration), and from configuration bypass 136 to firmware ("FW") topology kernel 141. They are returned from FW topology kernel 141 through essentially a similar path, namely from FW topology kernel 141, to configuration bypass 136, and once received at configuration bypass 136 they are sent over link 174 to CC mux 133, which then sends the completion signal to PCIe hard block 121, which forwards it to the host 105.

For a read request, FW Topology Kernel 141 collects the status from status registers of configuration bypass 136, maps the status to the current topology, and returns the completion back to the host 105 via configuration bypass 136, along link 174 to CC mux 133, and through PCIe hard block 121.

For a write request, FW Topology Kernel 141 maps it to the current topology, writes to the corresponding register, and returns the completion back to Host 105. For non-datapath related access targeting virtual link related registers, FW Topology Kernel 141 may, for example, host those registers itself, meaning that it does not need to read the status from, or write the configuration into, the configuration bypass 136.

As shown in FIG. 2, configuration bypass 136 has register access to vDSP registers 141 and vEP datapath registers 158, and also exchanges configuration information with virtual hot plug handler 139. Similarly, vDSP registers 137 and vEP datapath registers 158 exchange control and status information with vDSP processing 138 and vEP processing 159. As noted above, PCIe completor requests from the host 105 are sent through CO mux 135. These may be configuration PCIe completor requests, sent over link 176, or, for example, non-configuration PCIe completor requests, sent over link 177.

It is noted that any links or signal pathways that are shown in the example system 210 of FIG. 2, but that are not explicitly described above, are standard PCIe links and protocols, and not germane to aspects of the VHPC that is the focus of this disclosure. Persons skilled in the art readily understand the standard PCIe structure and protocols used in responding to hot plug instructions.

Figure 3:
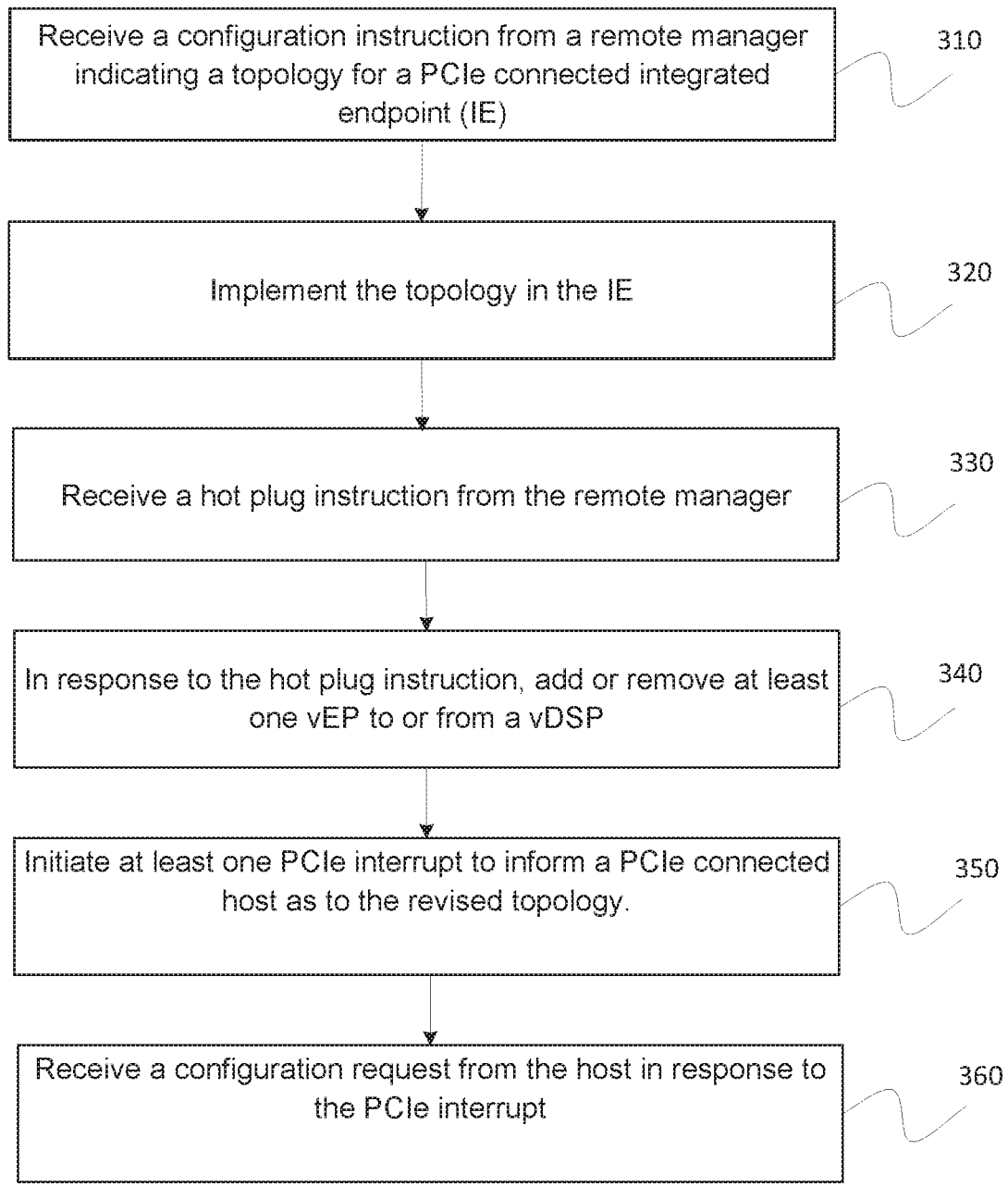
FIG. 3 is a flow diagram of a method for virtually hot adding or hot removing PCIe physical functions, according to an example.

FIG. 3 is a flow diagram of a method 300 for managing a pool of PFs in a PCIe IE, according to an example. Method 300 includes blocks 310 through 350. In alternate examples, method 300 may include greater, or fewer, blocks. Method 300 begins at block 310 where a configuration instruction from a remote manager is received, the configuration instruction indicating a topology for a PCIe connected integrated endpoint. For example, the instruction may be received at an FPGA in which PCIe integrated endpoint system 110 of FIG. 1 is implemented. For example, the configuration instruction may be received from a remote management agent 103, as further illustrated in FIG. 1. Finally, for example, the configuration instruction may direct the PCIe connected integrated endpoint to divide the IE into a number K of vDSPs, where K is an integer between 1, as shown for topology 1 180, and some upper limit N, as shown for topology N 185, both as shown in FIG. 1.

From block 310, method 300 proceeds to block 320, where the topology is implemented in the IE. For example, the topology implemented according to the configuration instruction may be more centralized, as in the case of topology 1 180 of FIG. 1, where there is a single vDSP, to which all of the available PFs are associated, or, for example, the topology may be wholly decentralized one, as in the example topology N 185 of FIG. 1, where there are N vEPs, each having only one PF.

From block 320, method 300 proceeds to block 330, where a hot plug instruction is received from the remote manager, the hot plug instruction directing the VHPC to add one or more vEPs to a vDSP, remove one or more vEPs from a vDSP, or perform any combination of the two.

From block 340, method 300 proceeds to block 350, where at least one PCIe interrupt is initiated to inform a PCIe connected host as to the revised topology. For example, the PCIe interrupt may be sent from PCIe interrupt generator 134 of FIG. 1, or, for example, PCIe interrupt generator 134 of the alternate PCIe Integrated endpoint system 210 shown in FIG. 2.

From block 350, method 300 proceeds to block 360, where a configuration request is received from the host in response to the PCIe interrupt that was initiated at block 350.

In one or more examples, the configuration request sent by the host 105 is a standard PCIe configuration request, where the host polls a DSP for PCIe hot plug status information. Method 300 terminates at block 360.

As noted above, in one or more examples, FPGA soft logics, and/or software intervention may be used to provide remote configuration, dynamic allocation and PCIe compliance. FIG. 4 illustrates an example FPGA architecture that may be so used. With reference thereto, FPGA 400 includes a large number of different programmable tiles including multi-gigabit transceivers ("MGTs") 1, configurable logic blocks ("CLBs") 2, random access memory blocks ("BRAMs") 3, input/output blocks ("IOBs") 4, configuration and clocking logic ("CONFIG/CLOCKS") 5, digital signal processing blocks ("DSPs") 6, specialized input/output blocks ("I/O") 7 (e.g., configuration ports and clock ports), and other programmable logic 8 such as digital clock managers, analog-to-digital converters, system monitoring logic, and so forth. Some FPGAs also include dedicated processor blocks ("PROC") 10. FPGA 400 can include one or more instances of PCIe Integrated Endpoint System 100, or of PCIe Integrated Endpoint System 210, also as described above.

In some FPGAs, each programmable tile can include at least one programmable interconnect element ("INT") 11 having connections to input and output terminals 20 of a programmable logic element within the same tile, as shown by examples included at the top of FIG. 5. Each programmable interconnect element 11 can also include connections to interconnect segments 22 of adjacent programmable interconnect element(s) in the same tile or other tile(s). Each programmable interconnect element 11 can also include connections to interconnect segments 24 of general routing resources between logic blocks (not shown). The general routing resources can include routing channels between logic blocks (not shown) comprising tracks of interconnect segments (e.g., interconnect segments 24) and switch blocks (not shown) for connecting interconnect segments. The interconnect segments of the general routing resources (e.g., interconnect segments 24) can span one or more logic blocks. The programmable interconnect elements 11 taken together with the general routing resources implement a programmable interconnect structure ("programmable interconnect") for the illustrated FPGA.

In an example implementation, a CLB 2 can include a configurable logic element ("CLE") 12 that can be programmed to implement user logic plus a single programmable interconnect element ("INT") 11. A BRAM 3 can include a BRAM logic element ("BRL") 13 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 6 can include a DSP logic element ("DSPL") 14 in addition to an appropriate number of programmable interconnect elements. An IOB 4 can include, for example, two instances of an input/output logic element ("IOL") 15 in addition to one instance of the programmable interconnect element 11. As will be clear to those of skill in the art, the actual I/O pads connected, for example, to the I/O logic element 15 typically are not confined to the area of the input/output logic element 15.

In the pictured example, a horizontal area near the center of the die (shown in FIG. 5) is used for configuration, clock, and other control logic. Vertical columns 9 extending from this horizontal area or column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, processor block 10 spans several columns of CLBs and BRAMs. The processor block 10 can various components ranging from a single microprocessor to a complete programmable processing system of microprocessor(s), memory controllers, peripherals, and the like.

It is noted that FIG. 4 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 4 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Thus, in one or more examples, where, due to expanded hardware capabilities, multiple virtual devices are provided on a single physical card, and thus do not each have their own PCIe switch, a virtual hot plug controller emulates the hot plug functionality for any of those virtual devices on the physical card. In such examples, the virtual PCIe hot plug controller may virtually hot add or hot remove either a single PCIe Physical Function, or group of PCIe Physical Functions as devices via a native PCIe hot plug mechanism without a physical switch. In one or more examples, FPGA soft logics and/or software intervention may be used to provide remote configuration, dynamic allocation, and PCIe compliance.

While the foregoing is directed to embodiments of the present invention, other and further embodiments of the invention may be devised without departing from the basic scope thereof, and the scope thereof is determined by the claims that follow.

What is claimed is:

1. A method for managing a pool of physical functions ("PFs") in a peripheral component interconnect express (PCIe) integrated endpoint, comprising:
   receiving a configuration instruction indicating a topology for a PCIe connected integrated endpoint (IE);
   implementing the topology on the IE;
   receiving a hot plug instruction; and
   based, at least in part, on the hot plug instruction, adding or removing, from a virtual downstream port (vDSP) on the IE, a virtual endpoint (vEP) and its respective PFs, wherein the topology defines a number of vDSPs provided on the IE.

2. The method of claim 1, further comprising, based on the hot plug instruction at least one of:
   adding one or more PFs to a vEP;
   removing one or more PFs from a vEP; or
   any combination of adding and removing PFs to or from a vEP.

3. The method of claim 1, wherein the configuration instruction and the hot plug instruction are received from a remote management agent.

4. The method of claim 1, further comprising:
   initiating at least one PCIe interrupt to inform a connected host as to a status change; and
   based on the PCIe interrupt, receiving a configuration request from the host.

5. The method of claim 4, wherein initiating the at least one PCIe interrupt further comprises sending at least one of an MSI or an MSI-X interrupt to the host to at least one of:
   bind a device driver and allocate resources for hot adding an endpoint and its assigned PFs; or
   unbind a device driver and release resources for hot removing an endpoint and its assigned PFs.

6. The method of claim 4, wherein the PCIe IE is provided in a PCIe integrated endpoint system, and wherein the host is coupled to the PCIe integrated endpoint system over a PCIe link.

7. The method of claim 6, wherein the host and the PCIe integrated endpoint system are both located in a datacenter.

8. The method of claim 6, wherein the PCIe integrated endpoint system is implemented in a field programmable gate array ("FPGA").

9. The method of claim 1, wherein each vDSP having an associated vEP.

10. The method of claim 9, wherein each vEP is coupled to a virtual downstream port.

11. The method of claim 9, wherein implementing the topology further comprises grouping PFs into each of the vEPs.

12. The method of claim 9, further comprising wherein implementing the topology dividing the IE into a number of K vDSPs.

13. A peripheral component interconnect express (PCIe) integrated endpoint system, comprising:
    a PCIe connected integrated endpoint ("IE") having a pool of PFs; and
    a virtual hot plug controller ("VHPC"), configured to:
      receive a configuration instruction from a remote manager indicating a topology for the IE;
      implement the topology on the IE;
      receive a hot plug instruction from the remote manager; and
      based on the hot plug instruction, add or remove, from a vDSP of the IE, at least one virtual endpoint (vEP) and its respective PFs, wherein the topology defines a number of vDSPs provided on the IE.

14. The system of claim 13, further comprising a PCIe upstream port coupled to the VHPC and to a host, the VHPC configured to communicate at least one PCIe interrupt to the host.

15. The system of claim 13, wherein the VHPC receives the configuration instruction from a remote management agent.

16. The system of claim 13, wherein the VHPC includes an input interface, configured to receive the configuration instruction and the hot plug instruction, and a PCIe topology mapper, configured to generate the topology for the IE based, at least in part, on the configuration instruction.

17. The system of claim 13, wherein the topology includes a set of vDSPs and corresponding vEPs, each vEP having one or more PFs.

18. The system of claim 17, wherein the topology further incudes a set of virtual downstream ports, respectively corresponding to, and coupled to, the set of vEPs.

19. The system of claim 13, wherein the VHPC further includes:
    a PCIe topology mapper, configured to map the configuration instruction to the topology; and
    a PCIe interrupt generator, configured to generate at least one PCIe interrupt to inform a PCIe connected host as to the topology as implemented, or as to any vEP connectivity changes in the topology as a result of a hot plug instruction.

20. The system of claim 19, wherein the VHPC is further configured to:
   initiate the at least one PCIe interrupt to inform the PCIe connected host as to a revised set of vEP to vDSP connections; and
   receive a configuration request from the PCIe connected host based on the at least one PCIe interrupt.

* * * * *